United States Patent
Mattila et al.

(10) Patent No.: US 7,261,789 B2
(45) Date of Patent: *Aug. 28, 2007

(54) METHOD OF PRODUCING PAPERBOARD PRODUCT WITH AN EVEN THICKNESS

(75) Inventors: Jorma Mattila, Kangasala (FI); Hannu Suksi, Lohja as (FI)

(73) Assignee: Avenira Oy, Ylöjärvi (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/344,611

(22) PCT Filed: Aug. 14, 2001

(86) PCT No.: PCT/FI01/00717

§ 371 (c)(1),
(2), (4) Date: Feb. 13, 2003

(87) PCT Pub. No.: WO02/14061

PCT Pub. Date: Feb. 21, 2002

(65) Prior Publication Data

US 2003/0173044 A1    Sep. 18, 2003

(30) Foreign Application Priority Data

Aug. 15, 2000  (FI)  ................................. 20001799

(51) Int. Cl.
*B31F 1/07* (2006.01)
(52) U.S. Cl. ........................ 156/209; 156/470; 156/555
(58) Field of Classification Search ................ 156/205, 156/209, 210, 219, 297; 493/11, 381, 156, 493/463, 396; 162/117, 362; 264/284; 428/165, 428/179, 180
See application file for complete search history.

(56) References Cited

U.S. PATENT DOCUMENTS

| | | | | |
|---|---|---|---|---|
| 999,951 A | * | 8/1911 | Bird | 428/178 |
| 1,802,880 A | * | 4/1931 | Cumfer | 156/205 |
| 2,996,425 A | | 8/1961 | Hamilton | 162/113 |
| 3,035,380 A | * | 5/1962 | Leavens | 53/458 |
| 3,617,427 A | * | 11/1971 | Le Blanc | 428/182 |
| 3,644,159 A | * | 2/1972 | Edkvist | 156/210 |
| 3,867,225 A | * | 2/1975 | Nystrand | 156/209 |
| 4,361,260 A | * | 11/1982 | Hanlan | 226/30 |

(Continued)

FOREIGN PATENT DOCUMENTS

DE    19802913 A1    7/1999

(Continued)

*Primary Examiner*—Richard Crispino
*Assistant Examiner*—Barbara J. Musser
(74) *Attorney, Agent, or Firm*—Kubovcik & Kubovcik

(57) ABSTRACT

A method is disclosed for producing a multilayer paperboard product, as well as an assembly suited for implementing the method and a paperboard manufactured according to the method, whereby the paperboard is made from at least two, advantageously three layers (4, 5, 6) bonded to each other by gluing, and the material of the middle layer (5) is subjected to mechanical working in a dry state (8) so as to deform the material prior to gluing through pressing thereon desired pattern that is raised from the surface of the material (5). The layers (4, 5, 6) are bonded to each other in a single step (7). The method is capable of providing a strong paperboard that uses less fiber than prior-art paperboards of equal thickness and strength.

10 Claims, 1 Drawing Sheet

U.S. PATENT DOCUMENTS

| | | | |
|---|---|---|---|
| 4,560,429 A | 12/1985 | Credali et al. | 156/208 |
| 4,657,240 A * | 4/1987 | Bolliger | 271/250 |
| 5,122,212 A * | 6/1992 | Ferguson et al. | 156/209 |
| 5,316,622 A | 5/1994 | Babinsky et al. | 162/109 |
| 5,769,311 A * | 6/1998 | Morita et al. | 229/403 |
| 5,792,307 A | 8/1998 | Montgomery | 156/364 |
| 6,019,865 A * | 2/2000 | Palmer et al. | 156/265 |
| 6,143,113 A | 11/2000 | Berube | 156/210 |
| 6,454,689 B1 * | 9/2002 | Voss | 493/11 |
| 2005/0170148 A1 * | 8/2005 | Mattila et al. | 428/174 |

FOREIGN PATENT DOCUMENTS

| | | |
|---|---|---|
| DE | 19922631 A1 | 11/2000 |
| EP | 0794050 A1 | 9/1997 |
| WO | WO9745266 A1 * | 12/1997 |
| WO | 98/08674 A1 | 3/1998 |

* cited by examiner

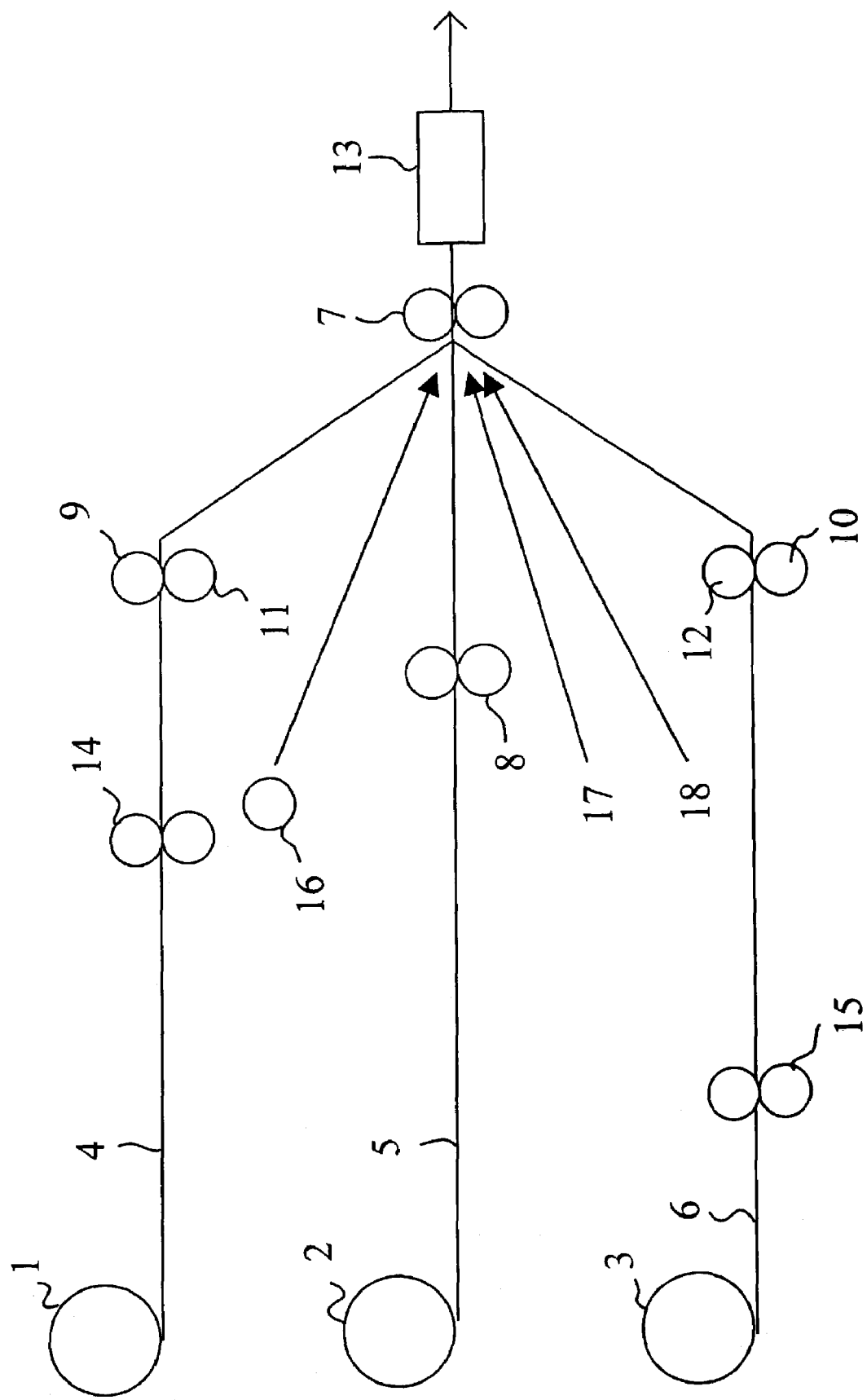

METHOD OF PRODUCING PAPERBOARD PRODUCT WITH AN EVEN THICKNESS

BACKGROUND OF THE INVENTION (1) Field of the Invention

The present invention relates to a method for manufacturing multilayer paperboard.

The invention also relates to an assembly suited for implementing the method and a paperboard product manufactured according to the invention.

(2) Description of Related Art

Paperboard is used for printing and its greatest use is in different types of packages. Important material qualities required from paperboard grades in packages are high strength and stiffness, as well as a sufficiently high quality of the printing substrate if text or pictures are to be printed on the package. Frequently, paperboards are also provided with barrier layers if they are used, e.g., for packaging liquids or products containing volatile components, such as coffee and other foodstuff. The surface quality of the printing substrate is determined by the requirements set on the quality of print on the product package, whereby luxury products obviously must be packaged in materials different from those used for shipping and consumer packages of bulk goods.

To make a paperboard sufficiently stiff, the paperboard must be produced rather thick, whereby a lot of raw material fiber stock is needed for manufacturing the paperboard. On the other hand, the higher the requirements set on the performance of the printing substrate, the more expensive raw materials must be used to render the product a sufficiently good brightness among other qualities. As the stiffness of paperboard is chiefly determined by its thickness, the specific material consumption and the raw material costs increase almost as a linear function of the product thickness and basis weight. Accordingly, it would be advantageous to have the surface of the paperboard made from a strong material of high density and good printing properties while the middle layer should have a low density. Conventionally, the density of the paperboard web is essentially constant over its entire cross section, because normal manufacturing techniques are incapable of producing a web with a substantially varying density across its thickness dimension. While folding paperboards do have a different density in the surface layer as compared to the density of the middle layer, even in these grades the variation in density is so small that there is no as effective way of reducing the material consumption of a thick paperboard as that offered by corrugated boards having a fluted middle layer. Hence, corrugated board is still preferred in the manufacture of packages due to the increasing demands on stiffer packaging materials.

Corrugated board is a layered product comprising two outer layers called liners and a corrugated middle layer known as fluting placed therebetween. In multilayer corrugated boards, the number of fluted middle layers may be greater than one, and the middle layers are separated from each other by planar paperboard layers similar to those forming the liner layers. While the shape, inter-crest spacing and height of the flutes may vary, fluting is invariably made in a perpendicular direction to the machine direction of the raw material webs. Since the entire web used in the middle layer is fluted without deforming the smooth surface continuity of the web sides, the fluted crests form linear and continuous bonding patterns on the surface whereto it will be glued. As a result, the rigidity of the middle layer becomes different in the lateral and longitudinal directions. In paperboard webs, the fibers orient themselves during web manufacture chiefly in the machine direction, that is, in the longitudinal direction of the web. As a result, the strength properties of the web become different in the cross-machine and machine directions. In a corrugated board, this difference is equalized by the greater stiffness of the middle layer in the direction of the flutes. Herein, the term "direction of flutes" is used in the meaning of the longitudinal direction of the crests and valleys of the flutes.

Although corrugated board is an advantageous packaging material, it has several shortcomings. The compressive strength of corrugated board varies in a wide range depending on whether the compressive force is imposed on a crest or a valley, and, furthermore, liner layers are not necessarily planar at all points, but they may have deformations caused by such factors as minor shrinkage after gluing, for instance. Of course, the surface layer properties of corrugated board are dependent on the thickness and quality of the liner, but nevertheless corrugated board is not generally considered to be a material of choice for printing with contacting printing methods, which curtails its use in premium-quality packages. While corrugated board grades as a rule also tend to be relatively thick, recently thinner corrugated boards with lower basis weights have been introduced commercially. The excessive thickness of this material limits its use in both printed products and small retail packages that are limited by their external dimensions. Accordingly, corrugated board does not usually serve as an alternative to paperboard at least in packages of premium quality.

One further shortcoming of corrugated board is its relatively complicated production process. A three-layer corrugated board is made by first fluting the web of the middle layer and then applying glue to the flute crests, whereupon the fluted medium is bonded by pressing to a first flat liner. The second flat liner is glued in a separate step to the thus formed two-layer base board. The glue is applied to the flute crests alone allowing the glue application to take place only by means of a hard-surfaced applicator such as a roll. This application method cannot assure a uniform bonding. The two-step production technique is expensive and a corrugated board production line becomes long and clumsy, thus requiring a large footprint and involving a high investment cost. In the manufacture of a multilayer corrugated board, the number of production steps increases in proportion to the number of layers in the product.

BRIEF SUMMARY OF THE INVENTION

It is an object of the present invention to provide a method suited for manufacture of paperboard featuring a good stiffness and offering a ratio of specific material consumption to board stiffness lower than that of prior-art paperboard grades. It is another object of the invention to provide a method suited for bonding the paperboard layers to each other in a single step.

The goal of the invention is achieved by virtue of making the paperboard from at least two, advantageously three, layers bonded to each other by gluing and through working the web material of the middle layer in a dry state, prior to the gluing step, so as to obtain permanent deformations whose pattern projects in a desired, freely variable manner from the surface of the middle layer material.

It is another object of the invention to provide a method suited for bonding the paperboard layers to each other in a single step.

The invention offers significant benefits.

The invention makes it possible to produce high-quality, printable packaging grades of paperboard, wherein the ratio of stiffness to specific consumption of raw material, particularly of fibrous raw material, is substantially more advantageous than in conventional paperboard grades. The properties of the paperboard are easy to vary and it may also be produced in extremely lightweight grades. The bulk of the product is high, as well as its strength and flexural resistance in regard to its basis weight. In fact, the stiffness of the product can even exceed that of corrugated board. Conversely, in comparison to a product of equal stiffness and strength, the paperboard manufactured according to the invention can be made using a smaller amount of fibrous stock. Hence, the novel paperboard is more cost-effective to manufacture and it imposes a lower environmental load than that of a conventional paperboard in which all plies are solid layers. The product is completely and readily recyclable provided that all layers of the product are made from a cellulosic fiber material. If the product requires moisture or gas barriers, these can be implemented using conventional foil/film materials. Herein, the recyclability of the product is dictated by the type of foil/film used, whereby in favor of recyclability it is advantageous to select foil/film materials that are recyclable in conjunction with the fibrous stock.

The properties of the paperboard can be varied in multiple ways. By virtue of varying shape and dimensions of the pattern formed in the middle layer, it is possible to control, not only the thickness of the final product, but also its strength qualities in different directions, while the liner qualities can be varied to obtain desired printing properties of the paperboard. The paperboard liner can be, e.g., a coated and calendered grade thus rendering the product good printing properties. As the thickness profile of the paperboard is calibrated to an even thickness and the compressive resistance of the paperboard in a direction perpendicular to its surface is uniform, the novel paperboard can be printed at a high quality using conventional contacting-type printing techniques such as offset, flexographic and digital printers, for instance.

The paperboard can be produced in a single nip and, as the application of the glue may be carried out using a plurality of different techniques one of which is spraying, the interbonding of the web layers and application of glue thereto is a simple operation. In most preferred form, the product is immediately ready for use, which means that it needs no drying or storage steps, but rather, may be taken directly to further conversion. Inasmuch the web of the middle layer is worked mechanically by pressing without heating, the middle layer forming means can be made very simple. As the invention can be adapted for use with different kinds of materials, the paperboard may be produced from the most cost-efficient raw materials available at a given time. This feature may be utilized when, for instance, the product is not requested to have a high brightness, whereby material costs can be cut advantageously by using less bleached fiber or recycled fiber not subjected to complete bleaching. The strength qualities of the product may be varied also through the use of different kinds of glues. For instance, gluing can be made using foamed glue that fills the cavities of the product thus substantially improving the stiffness of the product. One or more layers of the product can be of a polymer material or a metallic foil and, furthermore, one of the layers can be coated with a material that forms a desired kind of film or barrier. These grades of paperboard are needed, e.g., for packages used for liquids or packages that are impervious or weakly pervious to moisture and gases, and for heat-sealable products. Of course, plural different foils/films may be laminated in a single product.

In the following, the invention will be examined in more detail by making reference to the appended drawing in which an embodiment of the invention is illustrated schematically.

BRIEF DESCRIPTION OF THE DRAWING

The drawing is a schematic diagram illustrating an embodiment of the method of the invention.

DETAILED DESCRIPTION OF THE INVENTION

The exemplary embodiment shown in the diagram is suited for the manufacture of a three-layer product. To make such a three-layer product, three webs 4, 5, 6 are needed that are taken to the manufacturing process as material rolls 1, 2, 3. As required by the process, the webs are paid off from the rolls 1, 2, 3 and passed into a bonding/calibration nip 7 formed between two opposed rolls. The webs are bonded to each other in this nip 7. Initially, the middle-layer web 5 is passed into the nip of embossing rolls 8 that works the web by pressing thereon a raised pattern through embossing of the web 5 in a dry state so as to deform the web surface in a permanent manner. In this context, a dry web must be understood as have the normal moisture content of a web being paid off from a storage or machine roll 2, that is, the delivery moisture content of the web roll, typically less than 10%, generally 3% to 12%. Furthermore, the embossing operation is performed without subjecting the web to heating or steaming. Most advantageously, the web surface is embossed with a three-dimensional pattern such as a honeycomb pattern, whereby the strength of the web after embossing both in the orientation direction of the fibers and in the cross-machine direction is equally good, which is not the case in a two-dimensional fluted medium of corrugated board, for instance. The liner webs 2 and 6 are passed over gluing rolls 9-12. The function of these is such that the rolls 9, 10 running on the exterior side of the liner webs 4, 6, respectively, serve as backing rolls, while the glue is applied to the interior sides of the liner webs 4, 6 on the periphery of the applicator rolls 11, 12, respectively. The glue-coated liner webs 4, 6 are next passed with the embossed middle-layer web 5 through a bonding nip, where the webs adhere to each other and, simultaneously, the thickness of the paperboard is calibrated by pressing the web between the rolls. In this fashion, the manufacture of the product and interbonding the webs thereof can be performed in a single step in conjunction with the calibration of the paperboard thickness. The bonding nip 7 also serves as the draw nip for the webs. After bonding, the product can be dried if necessary by a dryer 13 depending on the curing requirements of the glue used. Of course, the glue can be cured using other types of reactions as dictated by the glue applied to the web.

The above-described process may involve a plurality of different steps that are examined below in the view of different production line alternatives and steps thereof.

The invention is directed to the manufacture of paperboard for consumer packages having a low resource need, whereby the goal of the invention is to cut down the specific consumption of raw materials used for the package. To this end, the present paperboard is specified as a multilayer packaging paperboard typically having a basis weight of 100 to 500 g/m$^2$. The thickness of the product is typically 0.5 to 1.5 mm making the product compatible with a variety of different printing techniques. Its production takes place via process wherein the dry fibrous webs are bonded to each other by gluing so that a two-layer or multilayer laminated material is obtained. The invention is based on mechanical working of the middle-layer web in a dry state so that permanent projecting deformations are produced thereon. The deformation step is advantageously carried out immediately before the gluing of the middle-layer web by its one side or both sides to a top liner, bottom liner or middle layer web. The glue is applied as a uniform layer to the surface of an undeformed web, whereby the surface sizing of the top liner occurs at the same time thus further improving the strength the product. The bonding of the webs to each other takes place in a single nip that also controls and calibrates the final thickness of the product.

The webs used in the product may be unfinished webs or converted webs of a basis weight in the range 30-200 $g/m^2$. Such webs may be grades that are finished by coating and/or calendering, as well as multilayer webs surfaced or foil/film laminated in varying ways. The middle-layer web can even be a tissue-grade paper web with the provision that the desired strength qualities can be met. One or more fibrous webs of the product may be replaced by a polymer material or metallic foil layer.

Prior to gluing, the liner webs 4, 6 can be treated in the same process line by patterning, for instance. In the above-described embodiment, the liner web 4 is worked mechanically by an graining technique that takes place in the nip 14. Additionally, the web or webs can be coated by a barrier material, for instance. In the exemplifying embodiment, this treatment is performed for one of the liner webs in nip 15. The treatment may be performed using functional barrier layer treatment agents or lacquers or by adhering to the web surface a foil/film having the desired properties. In the context of the present text, the term barrier coating refers to a treatment that makes the product impervious to a liquid or a gas. The application and fixing of such a treatment agent to a web is well known in the art, and several methods can be used to fulfill the task.

An essential feature of the invention is that it allows the product to be readily complemented with reinforcement bands and information technology elements such as magnetic bands, printed-circuit foils and disks with resonant identification chips/circuits or other passive/active elements of the data processing technology on the basis of which packages made from the present paperboard can be identified and the manufacture/use of such packages can be controlled. The reinforcement or magnetic band can be paid off from a coil 16 into the bonding nip 7, while other types of accessory elements are either introduced by suitable feeder means 17 into the bonding nip or applied to the glue-coated surface of the web.

The liner webs of the paperboard may be preprinted, whereby it is generally necessary to align the patterns printed on the opposite liner webs with each other. This may be accomplished with the help of, e.g., alignment marks printed on the liner webs. The alignment of the marks can be controlled by cameras or photocells. The invention makes such web alignment easy inasmuch the webs are bonded to each other in a single nip 7, whereby the alignment only needs a simple control of the mutual speeds of the webs. The alignment marks may also be utilized for feeding the above-mentioned data processing elements into desired positions of the web so that the elements become accurately aligned at proper sites in cut sheets and thus are correctly located in a package for a read or write operation.

The glue is applied to the entire surface of an unworked web that may be a liner web or a middle layer web. In this fashion it is possible to assure positive adherence of all points of the worked middle layer webs to the unworked web, whereby the curing of the glue also fortifies the product. The amount of glue applied is about 1-3 $g/m^2$ as the glue solids, which means that the glue may be applied using a film-transfer application technique, for instance. In practice, the glue can be applied by any method known in the art, exemplary ones of these methods being spray application, falling-curtain film application, gravure roll application and nozzle-jet application. The glue can be applied as a liquid or a dispersion or foam of solids in a liquid base solution. The glue may also be applied directly into the bonding nip 7 as denoted by arrow 18 in the diagram, particularly when a foamed glue or spray application is employed. It must be noted, however, that a uniform layer of glue must be applied to the surface of the unworked web in order to make a strong product and to assure complete gluing of the middle layer. Advantageously, the solids content of the glue should be high to avoid the need for vigorous drying of the product. Proper selection of the glue may also be utilized to affect the product qualities, and thus the gluing step can give the product such properties as controlled ESD (electrostatic discharge) protection, for instance. If the glue is applied as a foamed formulation, it fills the voids of the product thus particularly enhancing its compression resistance. One aspect favoring starch-based glues is that products glued with these formulations are readily recyclable.

The embossing of the middle layer 5 is made on a dry web by way of subjecting the web to compression so as to make permanent deformations thereon. Advantageously, the web surface should not be torn to maintain its maximum strength. The web is embossed in a dry state, since embossing the web in a moist state needs drying which is an energy-hungry and thus costly operation requiring efficient dryer equipment and, moreover, the drying of the web would affect the dimensions of the embossed pattern and the web itself, because a moist fibrous web undergoes a drastic shrinkage during drying.

In addition to those described above, the invention may have alternative embodiments.

The number of paperboard layers may be varied and web materials can be other than fibrous webs. However, at least one of the webs should be comprised generally of cellulosic fiber. The most preferred webs of the middle layer are those made from cellulosic fiber material as they render themselves well to mechanical working. On the other hand, if a most cost-efficient solution is sought, the web material can be made from groundwood pulp. For instance, an impervious packaging-grade paperboard may have one or more of the webs comprised of a polymer material or thin metal foil or even a treated semipermeable polymer film. While in the production method and apparatus according to the invention the webs are bonded to each other advantageously in a single nip, multilayer products may also be made by, e.g., first producing a three-layer paperboard whereto in a later step are bonded a required number of middle layers and liners.

In the apparatus according to the invention, the roll nips can be replaced by, e.g., belt presses or the like.

What is claimed is:

1. A method for producing a printable paperboard product comprising at least three layers, in which method paperboard raw material webs forming the layers of the product are bonded to each other by gluing, characterized in that
    at least one of the webs is worked mechanically in a dry state, when the moisture content of the web is not greater than 12%, by embossing thereon a raised pattern so as to deform the web surface in a permanent manner, at least two of the webs are planar unworked webs,
glue is applied between adjacent webs, and
the unworked webs are bonded to the at least one embossed web after the application of the glue in a bonding and calibration nip, wherein the webs are pressed against each other so as to calibrate the thickness of the bonded webs and provide the printable paperboard product having an even thickness.

2. Method according to claim 1, characterized in that said raised pattern on said embossed web comprises three-dimensional deformations.

3. Method according to claim 1, characterized in that glue is applied over the entire surface of those sides of the unworked webs that are intended to face the worked web.

4. Method according to claim 1, characterized in that at least one of said webs is treated so as to make the web impervious to liquid and/or gas.

5. Method according to claim 1, characterized in that into the bonding nip are introduced identification elements capable of aiding the identification of said paperboard product or a package made therefrom.

6. Method according to claim 1, characterized in that alignment marks are made to said webs and during the bonding step the webs are aligned with each other with the help of said marks.

7. Method according to claim 1, characterized in that the printable paperboard product has a basis weight of 100 to 500 $g/m^2$.

8. Method according to claim 1, characterized in that the printable paperboard product has a thickness of 0.5 to 1.5 mm.

9. Method according to claim 1, characterized in that the basis weight of each of the paperboard raw material webs is 30 to 200 $g/m^2$.

10. Method according to claim 1, characterized in that the amount of glue applied between adjacent webs is 1 to 3 $g/m^2$ as glue solids.

* * * * *